(12) United States Patent
Kakishita et al.

(10) Patent No.: US 7,148,838 B2
(45) Date of Patent: Dec. 12, 2006

(54) METHOD FOR ATTACHING RADAR FOR VEHICLE, RADAR FOR VEHICLE, AND MONITORING METHOD

(75) Inventors: Etsuo Kakishita, Hyogo (JP); Yukinori Yamada, Aichi (JP); Yuichi Tanaka, Aichi (JP); Hiroshi Mizuno, Aichi (JP)

(73) Assignee: Fujitsu Ten Limited, Kobe (JP)

(*) Notice: Subject to any disclaimer, the term of this patent is extended or adjusted under 35 U.S.C. 154(b) by 222 days.

(21) Appl. No.: 10/896,980

(22) Filed: Jul. 23, 2004

(65) Prior Publication Data

US 2005/0062641 A1 Mar. 24, 2005

(30) Foreign Application Priority Data

Jul. 23, 2003 (JP) ............... 2003-200216

(51) Int. Cl.
*G01S 13/93* (2006.01)

(52) U.S. Cl. .................. 342/70; 342/71; 342/175

(58) Field of Classification Search .......... 342/70–72, 342/75, 165, 173–175
See application file for complete search history.

(56) References Cited

U.S. PATENT DOCUMENTS

| | | | | |
|---|---|---|---|---|
| 5,005,661 A | * | 4/1991 | Taylor et al. ............ 180/219 |
| 5,313,213 A | * | 5/1994 | Neumann et al. ......... 342/165 |
| 5,667,176 A | * | 9/1997 | Zamarripa et al. ...... 248/231.51 |
| 5,911,395 A | * | 6/1999 | Hussaini .................. 248/206.3 |
| 6,489,927 B1 | * | 12/2002 | LeBlanc et al. ............ 343/713 |
| 6,828,931 B1 | * | 12/2004 | Kikuchi et al. ............ 342/174 |
| 6,842,152 B1 | * | 1/2005 | Kikuchi ...................... 343/713 |
| 7,061,424 B1 | * | 6/2006 | Kuroda et al. ................ 342/70 |
| 7,091,900 B1 | * | 8/2006 | Takano et al. ............... 342/70 |
| 2002/0101360 A1 | * | 8/2002 | Schrage ...................... 340/901 |
| 2002/0189875 A1 | | 12/2002 | Asanuma et al. |
| 2003/0184471 A1 | * | 10/2003 | Tohyama et al. ........... 342/175 |
| 2004/0017308 A1 | * | 1/2004 | Kikuchi ........................ 342/74 |
| 2004/0065814 A1 | * | 4/2004 | Miyazaki et al. ......... 250/222.1 |
| 2004/0085249 A1 | * | 5/2004 | Kitamori et al. ............ 343/776 |
| 2004/0099775 A1 | * | 5/2004 | Zheng et al. ............. 248/206.3 |
| 2004/0233094 A1 | * | 11/2004 | Isaji et al. .................... 342/20 |
| 2005/0062641 A1 | * | 3/2005 | Kakishita et al. ............ 342/70 |
| 2005/0219506 A1 | * | 10/2005 | Okuda et al. ................. 356/28 |
| 2006/0139205 A1 | * | 6/2006 | Raestad et al. ............... 342/74 |

FOREIGN PATENT DOCUMENTS

| JP | A-6-168400 | | 6/1994 |
|---|---|---|---|
| JP | 2005043080 A | * | 2/2005 |

* cited by examiner

*Primary Examiner*—John B. Sotomayor
(74) *Attorney, Agent, or Firm*—Oliff & Berridge, PLC

(57) ABSTRACT

An attachment method attaches a bracket to a vehicle, and attaches a radar to the bracket so that an axis of a directivity pattern of an antenna directs upward with respect to a horizontal direction. The antenna of the radar has an asymmetric vertical directivity pattern with respect to the axis of the directivity pattern.

18 Claims, 10 Drawing Sheets

METHOD FOR ATTACHING RADAR FOR VEHICLE, RADAR FOR VEHICLE, AND MONITORING METHOD

BACKGROUND OF THE INVENTION

1. Field of the Invention

The present invention relates to a method for attaching a radar for vehicle (Radar: Radio detecting and ranging), and a radar for vehicle. In more detail, the invention relates to an attachment method for attaching onto a vehicle in a proper manner a radar for vehicle that monitors front sight and rear sight of the vehicle, and to the radar for vehicle.

2. Description of the Related Art

In a conventional system for assisting driving of vehicles, a distance between oneself and a vehicle ahead and a relative speed therebetween are measured with using radar. Also, the conventional assisting system controls the vehicle to keep the distance between oneself and the vehicle ahead based on those measurement values.

FIG. 5 is a schematic diagram showing a state where conventional radar for vehicle is used. In FIG. 5, reference numeral 1 designates the radar for vehicle. An antenna (not shown) of the radar 1 for vehicle is attached in the vicinity of a grill of a vehicle 2 or inside a bumper of the vehicle 2. The radar 1 for vehicle has sharp directivity at frequency so as to be able to detect distance, direction, and velocity of an object (for example, a vehicle ahead) that is about 80 m–100 m from the vehicle 2. The directivity of an antenna can be evaluated using an angle (half width at a half maximum of the directivity) at a position where gain becomes smaller than a peak value by 3 dB in the directivity pattern. FIG. 8 shows a horizontal directivity pattern of one antenna, and $\theta_h$ represents a half width at a half maximum of the directivity. Generally, an antenna having $\theta_h$=about 4° in the horizontal directivity pattern is employed in radar for vehicle that detects at a distance of about 80 m–100 m. A reference numeral 1a represents a detection range of the radar 1 for vehicle.

As described above, the antenna of the radar 1 for vehicle is attached in the vicinity of the grill of the vehicle 2 or inside the bumper of the vehicle 2. That is, the antenna is attached at a low position relative close to a road surface. Therefore, a reflection wave from the road surface has great affect, so that there is a fear that the detection accuracy of the radar 1 for vehicle might degrade.

In order to solve these problems, JP-A-Hei. 6-168400 discloses the following techniques. In JP-A-Hei. 6-168400, a vertical directivity of an antenna has a downward gain, which is smaller than an upward gain, that is, is asymmetric. By employing this technique, even if an antenna of radar for vehicle is attached at a low position close to the road surface, affect of a reflection wave from the road surface can be reduced.

SUMMARY OF THE INVENTION

By making the horizontal directivity of an antenna be sharp (that is, making $\theta_h$ be small), the conventional radar 1 detects an object located at a position being relatively long distance (for example, in a range of about 80 m–100 m) from the vehicle 2. However, if the horizontal directivity is sharp, blind spot 1b occurs in the vicinity of the vehicle 2. Therefore, the radar 1 cannot an object existing in the vicinity of the vehicle 2.

The invention is made to solve the above-mentioned problem. In order to eliminate the blind spot caused in radar having sharp horizontal directivity, the invention provides radar having low horizontal directivity. Also, the invention provides an attachment method for attaching the radar having low horizontal directivity onto a vehicle.

In order to achieve the above object, a method for attaching radar according to one embodiment of the invention, attaches the radar to a vehicle so that an axis of a directivity pattern of an antenna directs upward with respect to a horizontal direction. The antenna of the radar has an asymmetric vertical directivity pattern with respect to the axis of the directivity pattern.

The radar for vehicle attached to the vehicle has the asymmetric vertical directivity pattern with respect to the axis of the directivity pattern.

Preferably, a horizontal directivity of the antenna may have a half width at a half maximum in a range of 10° to 60°. When the horizontal directivity of the antenna has the half width at the half maximum in a range of 10 to 60°, the radar for vehicle has less blind spot in comparison with an antenna having accuse horizontal directivity (for example, about 4° in the half width at the half maximum). However, since the horizontal directivity of the antenna of the radar for vehicle is weak (low), the vertical directivity is also low. Thus, a reflection wave from an object (for example, a road surface) existing in a region where detection is not required has large affect. It should be understood that even when the directivity of the antenna is accuse (for example, the half width at the half maximum in the horizontal directivity is about 4°), the reflection wave from the object existing in the region where the detection is not required affects on the radar for vehicle. However, in comparison with the case where the directivity is weak, the affection is small.

Therefore, if the radar for vehicle described above is attached to a vehicle without devising, it is difficult to reduce the affect of the reflection wave from the road surface sufficiently.

On the contrary, the method for attaching the radar for vehicle attaches the radar to the vehicle so that the axis of the directivity pattern of the antenna directs upward with respect to the horizontal direction. Therefore, the affect of the reflection wave from the road surface can be reduced to be very small. Thereby, detection accuracy of the radar for vehicle can be improved.

Also, a radar for vehicle according to one embodiment of the invention includes a transmission antenna that emits an electric wave. The transmission antenna of the radar has an asymmetric vertical directivity pattern with respect to an axis of a directivity pattern. A horizontal directivity of the transmission antenna has a half width at a half maximum in a range of 10° to 60°. When the radar for vehicle is attached to a vehicle, the axis of the directivity pattern of the transmission antenna directs upward with respect to a horizontal direction.

Since the horizontal directivity of the transmission antenna has the half width at the half maximum in a range of 10° to 60°, the directivity of the transmission antenna is weak. If the radar for vehicle described above is attached to a vehicle without devising, there is fear that affect of reflection wave from an object (for example, a road surface) existing in a region where detection is not required might become large. It should be understood that even when the directivity of the antenna is accuse (for example, the half width at the half maximum in the horizontal directivity is about 4°), the reflection wave from the object existing in the region where the detection is not required affects on the radar for vehicle. However, in comparison with the case where the directivity is weak, the affection is small.

According to the radar for vehicle, when the radar for vehicle is attached to the vehicle, the axis of the directivity pattern of the transmission antenna directs upward with respect to the horizontal direction.

Therefore, with the radar for vehicle, the same effect can be obtained as the case where a radar for vehicle is attached to a vehicle in accordance with the method for attaching the radar for vehicle so that the axis of the directivity pattern of the antenna directs upward with respect to the horizontal direction. That is, affect of the reflection wave from the road surface can be reduced drastically. Thereby, the detection accuracy of the radar for vehicle can be improved.

Also, there is no need to attach the radar for vehicle while adjusting the directivity of the antenna to direct upward. Therefore, the operation for attaching the radar for vehicle can be simplified.

Also, a monitoring method according to one embodiment of the invention performs the following procedures. First, electric wave is emitted from an antenna that has a symmetric vertical directivity pattern and has an axis of a directivity pattern directing upward with respect to a horizontal direction. Then, reflection wave of the electric wave is received.

Since the axis of the directivity pattern directing upward with respect to the horizontal direction, the same effect can be obtained as the radar for vehicle. That is, the affect of the reflection wave from the road surface can be reduced drastically. Therefore, the monitoring method can monitor an object accurately.

DESCRIPTION OF THE PREFERRED EMBODIMENT

[Embodiment 1]

Figure 1:
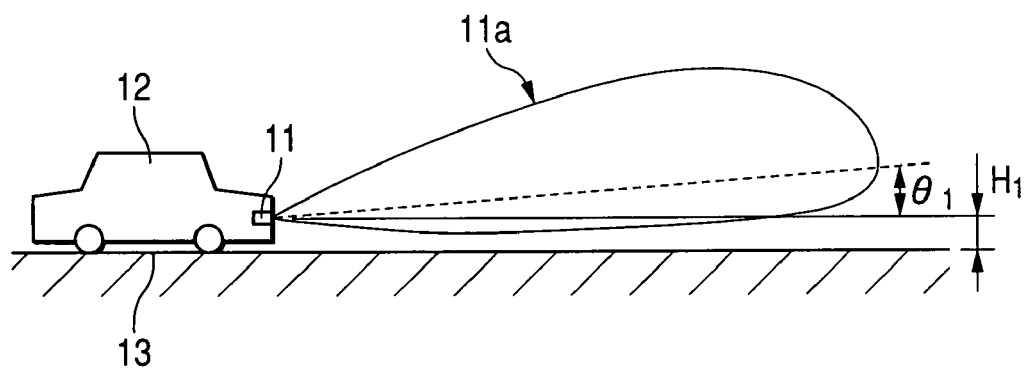
FIG. 1 is a schematic diagram showing a state where radar for vehicle is attached to a vehicle by using a method for attaching radar for vehicle according to an embodiment (1) of the invention.

Hereinafter, a method for attaching radar for vehicle and radar for vehicle according to embodiments of the invention will be described with reference to the drawings. FIG. 1 is a side view showing a state where radar for vehicle according to an embodiment (1) is attached to a vehicle. An antenna 14 of the radar 11 for vehicle is attached inside a bumper of the vehicle 12 (at a position of height $H_1$ (for example, 0.5 m) from a road surface 13). Also, the radar 11 for vehicle is attached so that an axis of a directivity pattern of the antenna directs upward by an angle $\theta_1$ with respect to the horizontal direction. Incidentally, in FIG. 1, reference numeral 11a designates a vertical directivity pattern of the transmission antenna 14 of the radar 11 for vehicle.

Figure 2:
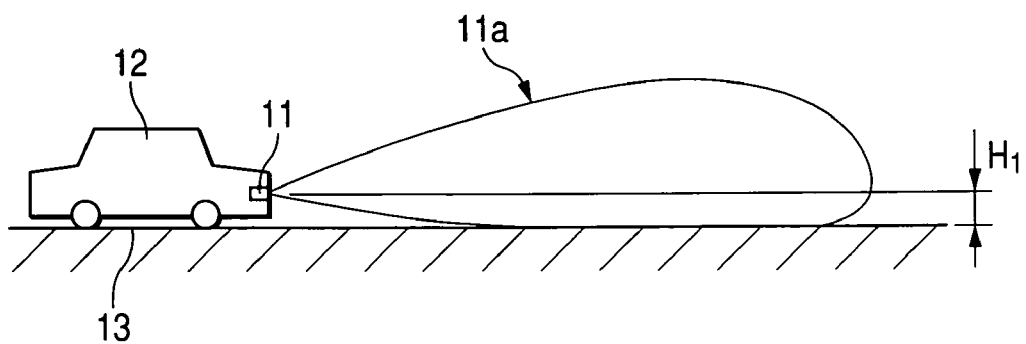
FIG. 2 is an explanatory view explaining the method for attaching radar for vehicle according to the embodiment (1).

FIG. 2 is a schematic diagram showing a state where the radar 11 for vehicle is attached to the vehicle so that the axis of the directivity pattern of the transmission antenna 14 is parallel to the road surface 13. As can be seen from FIG. 2, in the radar 11 for vehicle, the vertical directivity pattern of the antenna is asymmetric. Specifically, an upper area with respect to the axis of the directivity pattern of the antenna is larger than a lower area. Since the antenna is configured so that the lower gain of the antenna is smaller than the upper gain thereof, the vertical directivity pattern of the antenna is asymmetric as described above.

Figure 8:
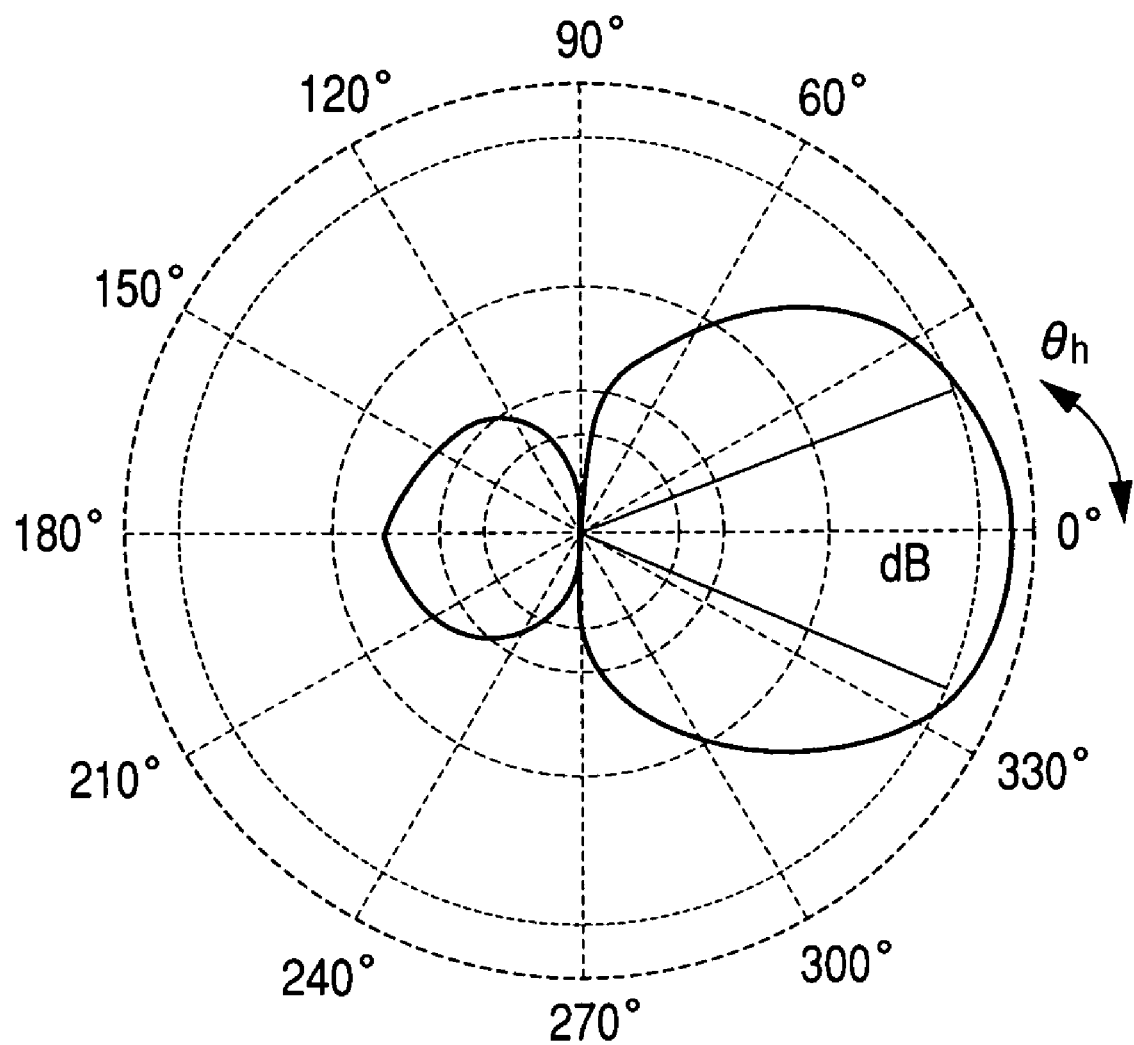
FIG. 8 is a view explaining an angle $\theta_h$ representing directivity of an antenna using a horizontal directivity pattern of one antenna.

The radar 11 for vehicle aims to reduce the blind spot shown in FIG. 8(b). Therefore, the transmission antenna of the radar 11 for vehicle has the horizontal directivity $\theta_h = 10°$ to $60°$. In comparison with the horizontal directivity ($\theta_h =$ about $4°$) of radar for detecting long distance (80 m to 100 m), the transmission antenna 14 has very low horizontal directivity. As the horizontal directivity of the transmission antenna 14 is lower, the vertical directivity of the transmission antenna is lower. As a result, detectable distance of the radar 11 for vehicle becomes short. In a case of the horizontal directivity $\theta_h = 10°$ to $60°$, the detectable distance is shorter than 10 m. The transmission antenna 14 of the radar 11 for vehicle emits an electric wave in a so-called millimeter band (3 GHz–30 GHz).

Figure 7:
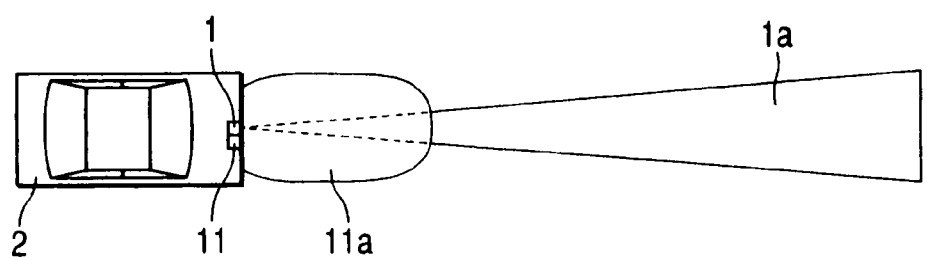
FIG. 7 is a plan view showing a state where the radar for vehicle according to the embodiment (1) is attached to the vehicle.

FIG. 7 is a plan view showing a state where the radar 11 for vehicle according to the embodiment (1) is attached to a vehicle. As described above, the detectable distance of the radar 11 for vehicle is short. Therefore, the conventional radar 1 that can detect long distance (about 80 m–100 m) may be attached to the vehicle as well as the radar 11 for vehicle. The conventional radar 1 may emits an electric wave in the millimeter band (3 GHz–30 GHz). Furthermore, the radars 1, 11 for vehicle may emit electric wave of the same frequency.

Figure 9:
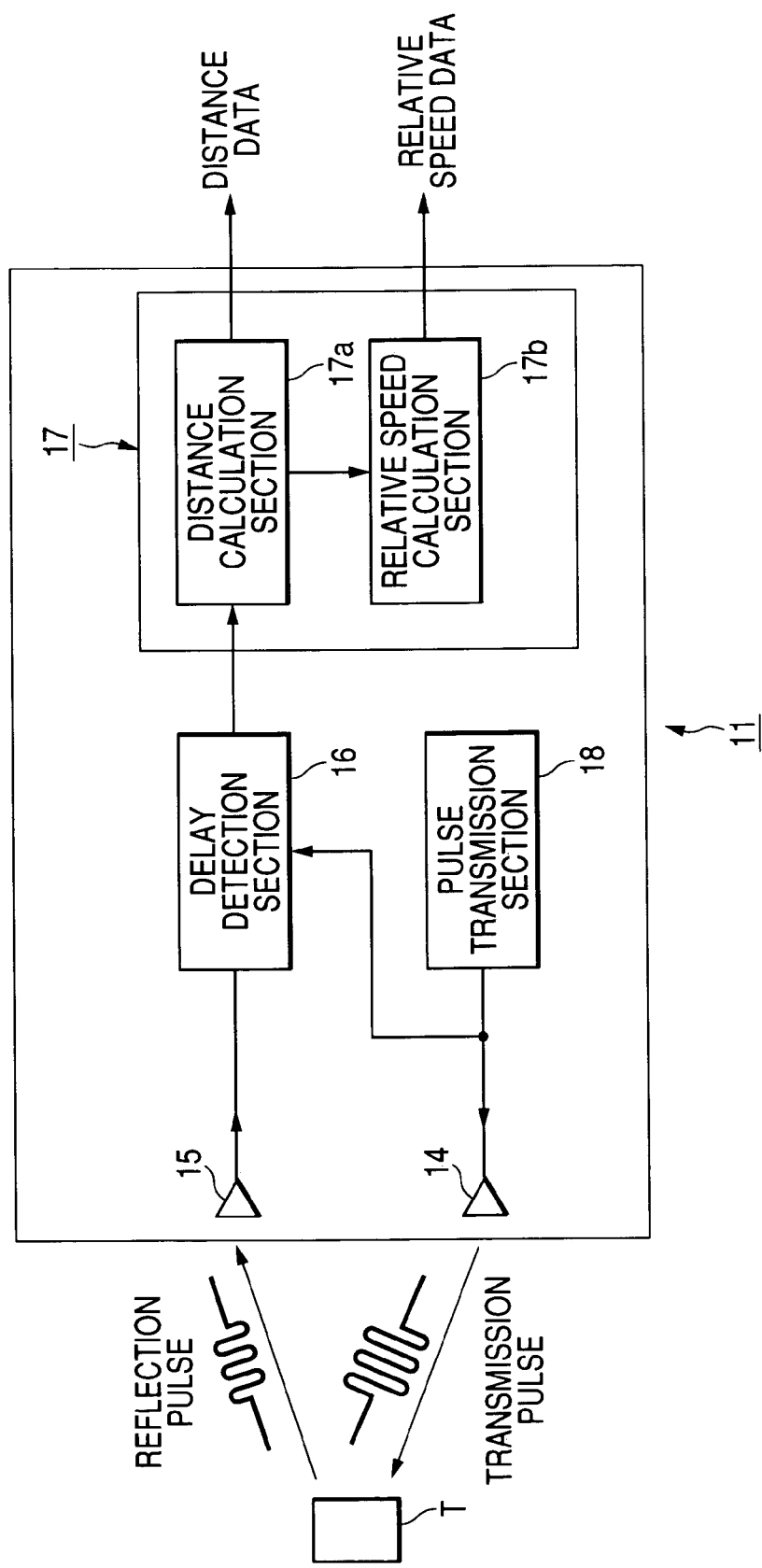
FIG. 9 is a block diagram showing an outline of an antenna 11.

FIG. 9 is a block diagram showing an outline of the antenna 11. The radar 11 includes the transmission antenna 14, a reception antenna 15, a delay detection section 16, a microcomputer 17, and a pulse transmission section 18. The pulse transmission section 18 inputs a pulse-like power into the transmission antenna 14, and the transmission antenna 14 emits a pulse-like electric wave. The reception antenna 15 receives a part of an electric wave (a reflection wave)

reflected by an object T. Upon receiving the reflection wave, the reception antenna 15 inputs a reflection signal into the delay detection section 16. The delay detection section 16 is connected to the pulse transmission section 14. The delay detection section 16 detects a time $t_1$ at which the pulse transmission section 14 outputs the power and a time $t_2$ at which the reflection signal is input from the reception antenna 15. A distance D between the radar 11 for vehicle and the object T can be calculated on the basis of a formula (1).

$$D = C(t_1 - t_2)/2 (c = 3 \times 10^8 m/s) \quad (1)$$

The microcomputer 2 includes a distance calculation section 17a and a relative speed calculation section 17b. The distance calculation section 17a calculates the distance D on the basis of $t_1$, $t_2$ input from the delay detection section 6 and the formula (1). The relative speed calculation section 17b a relative speed Δv between the vehicle 12 and the object T from time change of the distance D input from the distance calculation section 17a.

The following experiment was conducted using the radar 11 for vehicle described above.

(Experiment 1)

At first, objects were disposed at positions, which were distance $x_0$ (for example, 5 m) in the horizontal direction from the transmission antenna 14 of the radar 11 for vehicle and were $y_1$–$y_6$ in height from the horizontal surface of the transmission antenna 14. Next, an electric wave was emitted from the transmission antenna 14 of the radar 11 for vehicle, and a reflection wave from the disposed object were received by the reception antenna 15. Table 1 shows one example of relation between a reception level of the reflection wave by the reception antenna 15 and the angle $\theta_1$. Incidentally, in the table 1, "+" represents that the reception level of the reflection wave from the object was equal to or more than a predetermined level $P_1$. On the other hand, "−" represents that the reception level of the reflection wave from the object was less than the predetermined level $P_1$. $P_1$ corresponds to a detection threshold value of the delay detection section 16. That is, when the reception level of the reflection wave is less than the detection threshold value $P_1$, the delay detection section 16 cannot detect reception of the reflection wave. This is because if the reception level of the reflection wave is smaller than the detection threshold value $P_1$, the delay detection section 16 cannot distinguish the reflection wave from noise. Incidentally, a height of the object from the road surface 13, which is represented by $y_1$, is a sum of $y_1$ and $H_1$. Here, the height $H_1$ was 0.5 m.

TABLE 1

| | $y_1$ (1.0 m) | $y_2$ (1.5 m) | $y_3$ (2.0 m) | $y_4$ (2.5 m) | $y_5$ (3.0 m) | $y_6$ (3.5 m) |
|---|---|---|---|---|---|---|
| 3° | + | + | + | − | − | − |
| 4° | + | + | + | − | − | − |
| 5° | + | + | + | + | − | − |
| 6° | + | + | + | + | + | − |

As can be seen from the table 1, in order to make the reception level of the reflection wave from the object existing at a position of height $y_5$ (3 m) or more be less than the predetermined value $P_1$, it is necessary to suppress the angle $\theta_1$ to be equal to less than 5°. Generally, a land bridge and ceiling of tunnel are often provided at a height of 3.5 m or more ($=H_1+Y_6$) from the road surface. Therefore, if the radar 11 for vehicle can detect an object existing at a height of 3.5 m or more from the road surface, there is a fear that the radar 11 for vehicle may erroneously detect a land bridge or ceiling of tunnel as an obstacle ahead in a travel direction. However, since the angle $\theta_1$ is set to be equal to or less than 5°, it is possible to prevent the radar 11 for vehicle from detecting a land bridge or ceiling of tunnel existing at a height of 3.5 m or more erroneously.

(Experiment 2)

Then, objects were disposed at positions, which were distance $x_1$ to $x_7$ (3 m to 6 m) in the horizontal direction from the transmission antenna 14 of the radar 11, and the same experiment as the experiment 1 was conducted. A table 2 shows one example of relation between a reception level of the reflection wave by the reception antenna 15 and the angle $\theta_1$. Incidentally, in the table 1, "+" represents that the reception level of the reflection wave from the object was equal to or more than the predetermined level $P_1$. "−" represents that the reception level of the reflection wave from the object was less than the predetermined level $P_1$. "*" represents that the reception level of the reflection wave from the object was equal to or larger than the predetermined level $P_1$ but the radar 11 for vehicle erroneously detected a single object as plural objects.

Figure 10:
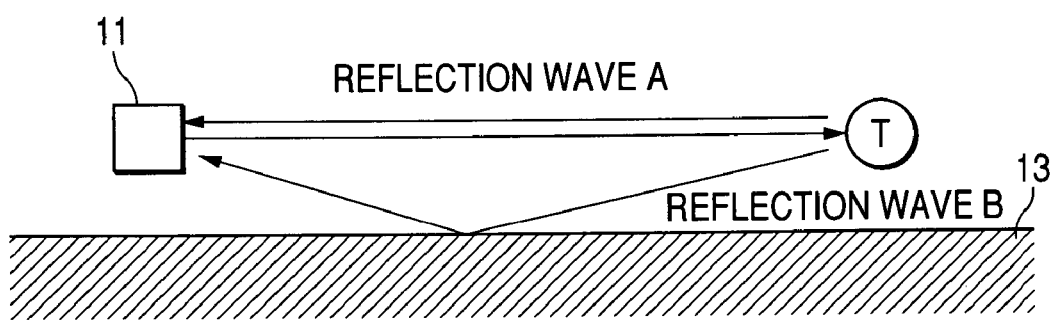
FIG. 10 is a view explaining a case where radar 11 for vehicle erroneously detects an object due to a road-surface reflection wave.

FIG. 10 is view for explaining a case where the radar 11 for vehicle erroneously detects a single object as plural objects. It is assumed that in FIG. 10, the angle $\theta_1$ is 0 degree and that an object T is disposed at a position of 0.5 m in height. An electromagnetic wave emitted from the transmission antenna 14 is reflected by the object T as described above. At that time, the object T reflects the incident electromagnetic wave at various angles. Normally, the reception antenna 15 receives reflection wave that directly propagates from the object T without being reflected by the road surface as indicated by reflection wave A. However, a (indirect) reflection wave that is further reflected by the road surface 13 and then reaches the reception antenna 15 is also present as indicated by a reflection wave B. If a distance D between the radar 11 for vehicle and the object T is very short (equal to less than 3.0 m), intensity of the reflection wave A is very large. Therefore, the delay detection section 16 can distinguish the reflection wave A from the reflection wave B, so that the false detection of the objection does not occur. If the distance D is long (equal to or larger than 6.0 m), intensity of the reflection wave B reaching the reception antenna 14 is very small. Therefore, the delay detection section 16 can distinguish the reflection wave A from the reflection wave B, so that the false detection of the object does not occur. However, if the distance D is in a range of 3.0 m to 6.0 m, the delay detection section 16 cannot distinguish the reflection wave A from the reflection wave B. It is apparent from FIG. 10 that the reflection wave A and the reflection wave B are different in a propagation distance. Therefore, although the objection T is a single object, the delay detection section 16 detects an objection based on the reflection wave A and another objection based on the reflection wave B separately. The experiment revealed that when the angle $\theta_1$ was in a range of 0° to 1°, the radar 11 for vehicle caused the false detection as described above.

TABLE 2

| | $x_1$ (3.0 m) | $x_2$ (3.5 m) | $x_3$ (4.0 m) | $x_4$ (4.5 m) | $x_5$ (5.0 m) | $x_6$ (5.5 m) | $x_7$ (6.0 m) |
|---|---|---|---|---|---|---|---|
| 0° | + | * | * | * | * | * | * |
| 1° | + | + | * | * | * | * | * |

TABLE 2-continued

| | $x_1$ (3.0 m) | $x_2$ (3.5 m) | $x_3$ (4.0 m) | $x_4$ (4.5 m) | $x_5$ (5.0 m) | $x_6$ (5.5 m) | $x_7$ (6.0 m) |
|---|---|---|---|---|---|---|---|
| 2° | + | + | + | + | + | + | + |
| 3° | + | + | + | + | + | + | − |
| 4° | + | + | + | + | + | − | − |
| 5° | + | + | + | + | + | − | − |
| 6° | + | + | + | + | − | − | − |

It is apparent from the table 2, the radar 11 for vehicle can detect an object located at a farther position, as the angle $\theta_1$ is smaller. However, if the angle $\theta_1$ is less than 2°, the radar 11 for vehicle causes the false detection as described above. Therefore, when the angle $\theta_1$ is set to be equal to or larger than 2°, it is possible to prevent the radar 11 for vehicle from erroneously detecting a single object as plural objects.

Consequently, it is preferable to attach to the vehicle 12 the radar 11 for vehicle including the transmission antenna 14 having asymmetric vertical directivity pattern so that the angle $\theta_1$ is larger than 0° (that is, the axis of the directivity of the transmission antenna 14 directs upward with respect to the horizontal direction).

More preferably, the radar 11 for vehicle may be attached to the vehicle so that the angle $\theta_1$ is equal to 2°. With this configuration, it is possible to prevent the radar 11 for vehicle from erroneously detecting a single object as plural object due to adverse affect of reflection by the road.

Also, it is preferable to attach the radar 11 for vehicle to the vehicle 12 so that the angle $\theta_1$ is equal to or smaller than 5°. With this configuration, it is possible to prevent the radar 11 for vehicle from detecting structures existing at a relatively high position (3.5 m or more in height) such as a land bridge and ceiling of tunnel.

More preferably, the radar 11 for vehicle including the transmission antenna 14 having the asymmetric vertical directivity pattern is attached to the vehicle 12 so that the angle $\theta_1$ is in a range of 2° to 5°.

[Embodiment 2]

Next, the radar 11 for vehicle according to an embodiment (2) will be described. In the embodiment (2) an attachment member, which is used when attaching the radar 11 for vehicle to the vehicle 12, will be described in detail. It should be noted that portions that are same as those in the embodiment (1) will be designated the same reference numerals, and description thereon will be omitted.

Figure 11A:
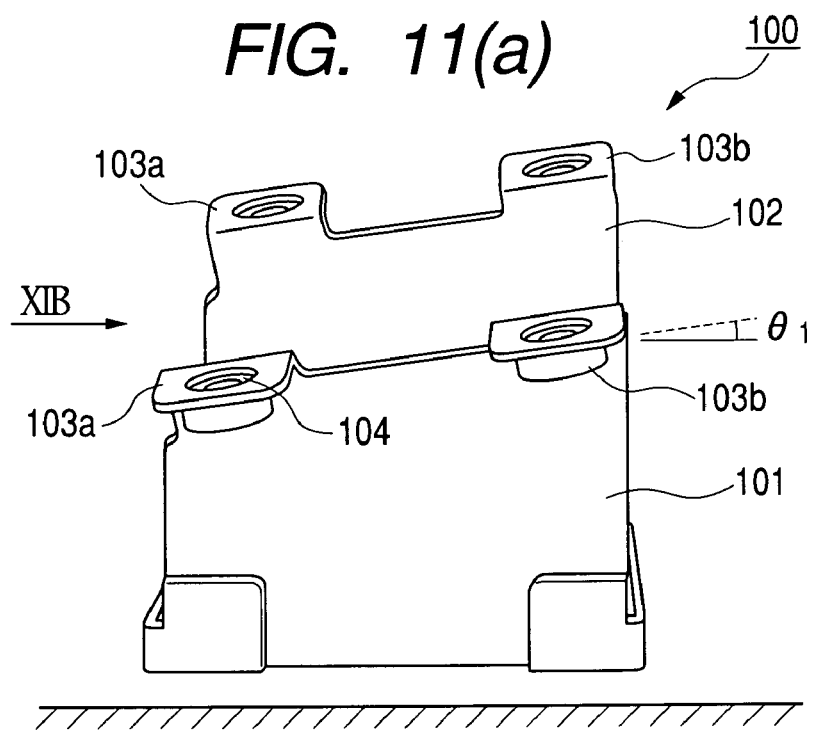
FIG. 11 is a side view showing a bracket 100, which is used when the radar 11 for vehicle is attached to a vehicle 12.
Figure 11B:
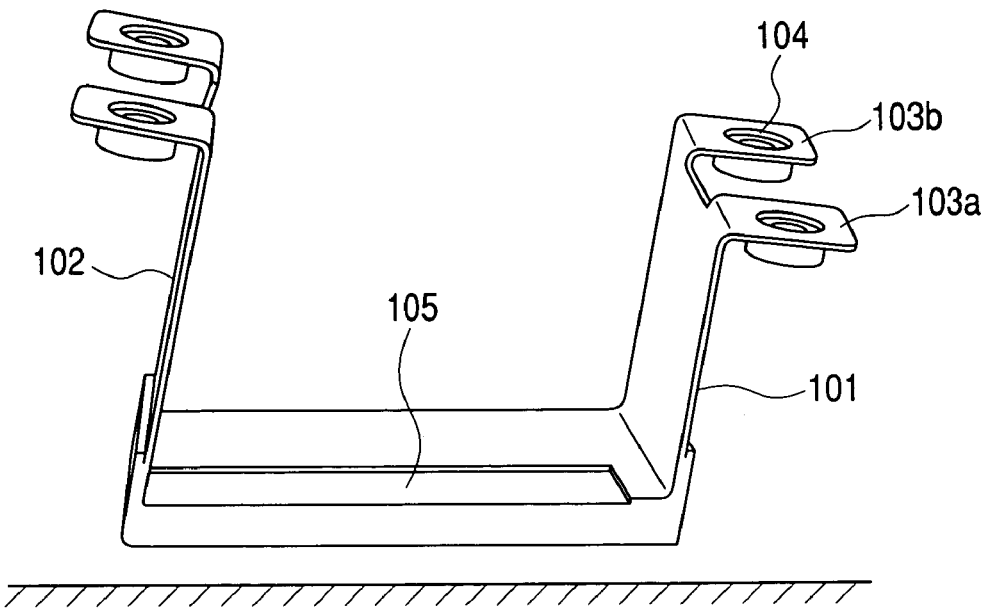

FIG. 11 is a side view showing a bracket 100 (an attachment member), which is used when the radar 11 for vehicle is attached to a vehicle 12. FIG. 11(a) is a side view showing the bracket 100 when a bottom plate 105 of the bracket 100 abuts against a plane. FIG. 11(b) is a side view showing the bracket 100 when viewed from an arrow XIB direction of FIG. 11(a). The bracket 100 includes a side plate 101, a side plate 102, and the bottom plate 105. The side plate 101 and the side plate 102 are erected from the bottom plate 105 in a substantially vertical direction. The side plate 101 and the side plate 102 include protrusion pieces 103a, 103b protruding outwardly of the bracket 100a at end portions, respectively. The protrusion pieces 103a, 103b define screw holes 104, respectively. As shown in FIG. 11(a) surfaces of the protrusion pieces 103a, 103b in which the screw holes 104 are defines are inclined at the angle $\theta_1$ to the bottom plate 105. In other words, inclination of the surfaces in which the screw holes 104 are defined to the bottom plate 105 determine the angle $\theta_1$ of the radar 11 for vehicle. It is noted that in FIG. 11, lengths between the bottom plate and the end portions of the side plates 101, 102 are equal to each other. However, the side plates 101, 102 may be configured so that these lengths are different from each other.

Figure 12:
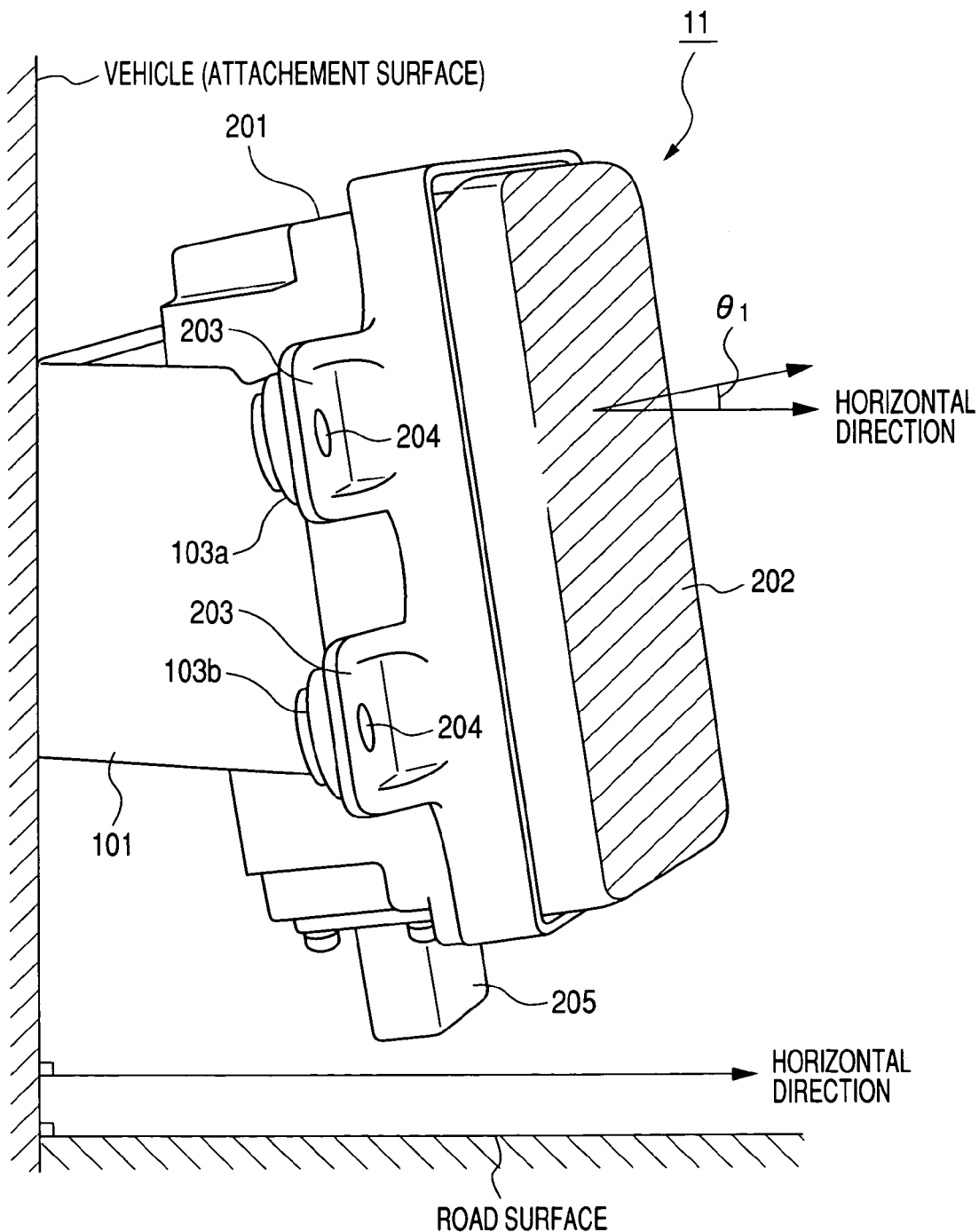
FIG. 12 is an enlarged side view showing a state where the radar 11 for vehicle is attached to the vehicle using the bracket 100.
Figure 14:
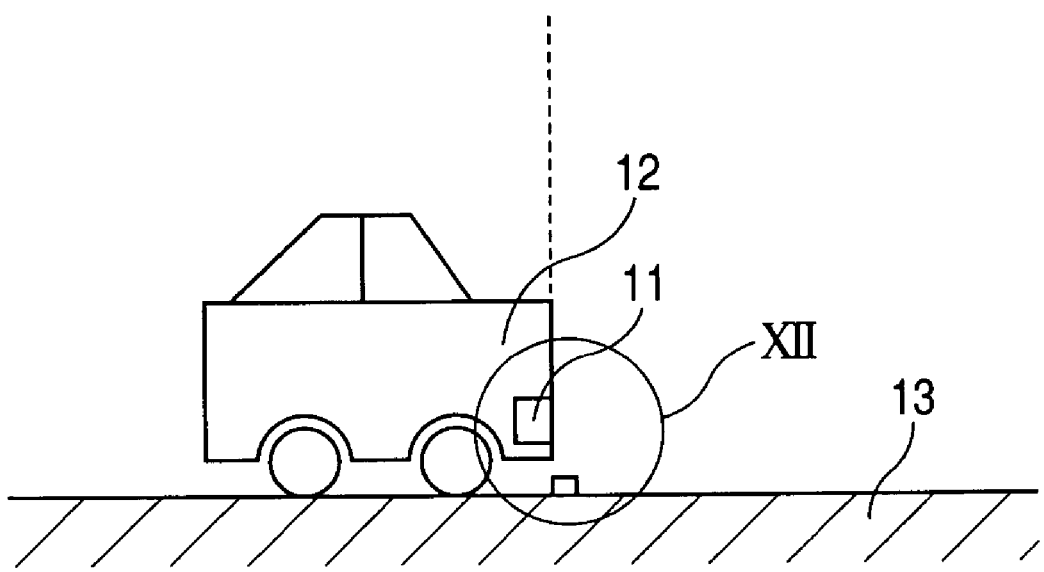
FIG. 14 is a side view showing a state where the radar 11 is attached to the vehicle 12.

FIG. 12 is an enlarged side view showing a state where the radar 11 for vehicle is attached to the vehicle using the bracket 100. FIG. 14 is a side view showing a state where the radar 11 is attached to the vehicle 12. FIG. 12 is a view enlarging a surrounded portion XII shown in FIG. 14. In the embodiment (2), the bracket 100 is attached to an attachment surface (vehicle) that is substantially perpendicular to the horizontal direction. A casing 201 of the radar 11 for vehicle and the bracket 100 are jointed by a bolt and a nut (not shown).

Of constituent components of the radar 11 for vehicle shown in FIG. 9, at least the transmission antenna 15 is disposed in the casing 201. The casing 201 includes a lid member 202 having a electric-wave emission surface, four protrusion pieces 203 protruding laterally, and a terminal 205 protruding in a substantially perpendicular direction to the protrusion pieces 203. The transmission antenna 15 is disposed inside the casing 201 and on a rear side of the lid member 202. Therefore, a shaded surface of the lid member 202 serves as the electric-wave emission surface. The transmission antenna 15 is, for example, a patch antenna. A patch pattern of the patch antenna is formed in a surface parallel to the electric-wave emission surface. It is noted that the electric-wave emission surface and the surfaces in which the screw holes 204 of the protrusion pieces 203 are parallel to each other. The four protrusion pieces 203 are formed to correspond to the protrusion pieces 103a, 103b of the bracket 100. Therefore, when bolts are inserted into the screw holes 204 of the protrusion pieces 203 and the screw holes 104 of the protrusion pieces 103a, 103b, and the nuts are used, the casing 201 and the bracket 100 can be jointed. The terminal 205 is electrically connected to the transmission antenna 14 in the casing. Therefore, the transmission antenna 14 can be connected to an external circuit via the terminal 205. It is noted that constituent components shown in FIG. 9 other than the transmission antenna 14 of the radar 11 for vehicle may be disposed outside of the casing 201.

Next, procedures for attaching the casing 201 to a vehicle with using the bracket 100 will be described. First, the bottom plate 105 of the bracket 100 is made to abut against the attachment surface of the vehicle. Then, a screw is inserted into a screw hole (not shown) defined in the bottom plate 105 and fastened, thereby fixing the bracket 100 to the vehicle. Next, the four protrusion pieces 203 formed on the casing 201 of the radar 11 for vehicle are made to abut against the protrusion pieces 103a, 103b so that the screw holes 104 and the screw holes 204 match each other. The bolts are inserted into the screw holes 104, 204 and are fastened, thereby jointing the bracket 100 and the casing 201. As described above, the surfaces in which the screw holes 104 of the protrusion pieces 103a, 103b are defined are inclined at the angle $\theta_1$ to the bottom plate 105. That is, at the time when the attachment operation of the casing 201 is completed, the surfaces in which the screw holes 104 are defined are inclined at the angle $\theta_1$ to the attachment surface of the vehicle. Also, as described above, the electric-wave emission surface of the lid member 202 and the surfaces in which the screw holes 204 are defined are parallel. As apparent from FIG. 12, the surfaces in which the screw holes 104 are defined and the surfaces in which the screw holes 204 are defined are parallel. Furthermore, the attachment surface of the vehicle is substantially perpendicular to the horizontal direction as described above. Accordingly, a normal line of the electric-wave emission surface of the radar 11 for vehicle is inclined at the angle θ₁ to the horizontal direction. That is, with using the bracket 100, it becomes possible to attach the radar 11 for vehicle including the transmission antenna 14 having the asymmetric vertical directivity pattern to the vehicle 12 so that the axis of the directivity pattern is inclined at the angle θ₁ to the horizontal direction. For example, the bracket 100 is manufactured so that the angle θ₁ is in a range of 2° to 5°. That is, the angle θ₁ can be determined at the time when the bracket 100 is manufactured. Therefore, it is not necessary for a worker who attaches the antenna 11 for vehicle to the vehicle 12 to conduct fine angle adjustment. As a result, the attachment process can be simplified and cost involved in the attachment process can be reduced.

MODIFIED EXAMPLE

Next, with reference to FIG. 13, a modified example of the bracket 100 and the casing 201 will be described. In the embodiment (2), θ₁ is the angle between the surface in which the screw holes 104 of the protrusion pieces 103a, 103b are defined and the bottom plate 105. However, in the modified example, the surfaces in which the screw holes 104 are defined and the bottom plate 105 are parallel. Also, in the embodiment (2), the surfaces in which the screw holes 204 are defined (the surfaces on a side of the electric-wave emission surface and those on a side of the bracket) are parallel. However, the modified example is also different in this point. The casing 201 includes the protrusion pieces 203a, 203b having different thickness. The protrusion pieces 203a, 203b get thinner as advancing in an arrow A direction. For example, an angle between a shaded surface of the protrusion piece 203a (one of the surfaces in which the screw hole 204 is defined) and a surface of the protrusion piece 203a on the side of the bracket (the other of the surface in which the screw hole 204 is defined) is θ₁. The protrusion 203b is configured in the similar manner. Also, the shaded surface (the one of the surfaces) of the protrusion piece 203a and the shaded surface (the one of the surfaces) of the protrusion pieces 203b are on the same plane. The surfaces (the other of the surfaces) of the protrusion pieces 203a, 203b on the side of the bracket are on the same plane similarly.

Figure 13:
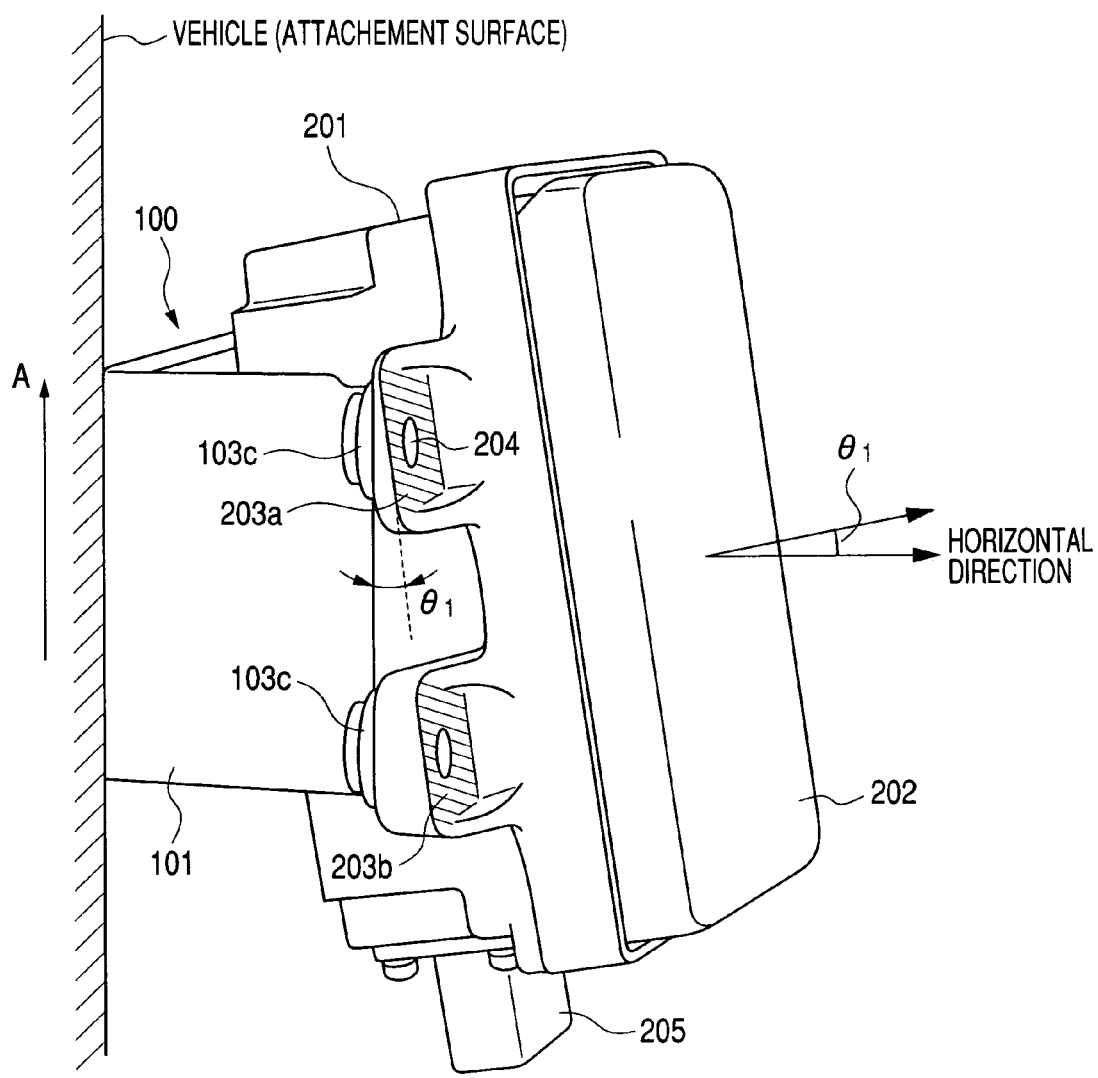
FIG. 13 is an enlarged side view showing a state where the radar 11 for vehicle is attached to the vehicle 12 with using a configuration of a modified example.

FIG. 13 is an enlarged side view showing a state where the radar 11 for vehicle is attached to the vehicle 12 with using a configuration of a modified example. It is noted that in FIG. 13, the bolt and the nut that joint the casing 201 and the bracket 100 are not shown. The attachment procedures are the same as those of the embodiment (2), and therefore the description thereon will be omitted. Since thickness of the protrusion pieces of the casing 201 abutting against bracket are made to be not uniform as described above, it is possible to attach to the vehicle 12 the radar 11 for vehicle including the transmission antenna 14 having the asymmetric vertical directivity pattern so that the axis of the directivity pattern is inclined at the angle θ₁ to the horizontal direction.

It is noted that the invention is not limited to the embodiment (2) and the modified example. The radar for vehicle may be attached to the vehicle with using the bracket so long as the axis of the directivity pattern is inclined at the angle θ₁ to the horizontal pattern. Since the structures of the bracket and the casing are utilized, it is possible to obtain the angle θ₁ without fine adjustment.

[Embodiment 3]

Figure 3:
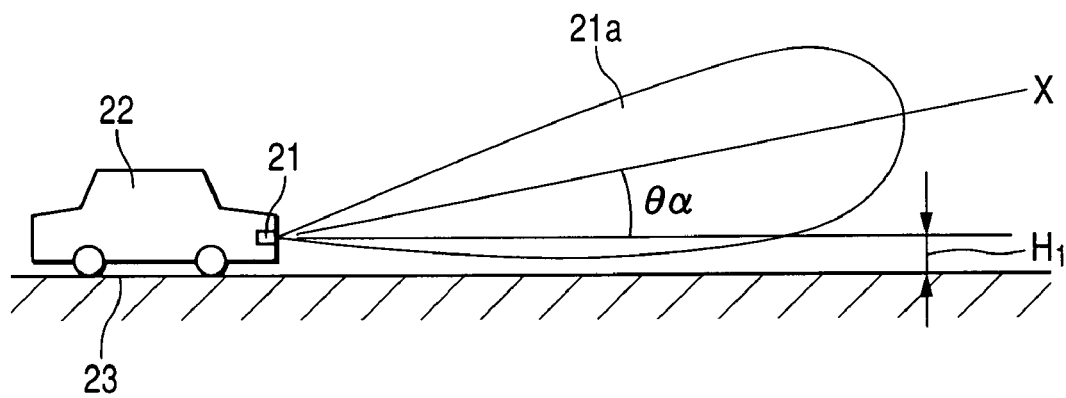
FIG. 3 is a schematic diagram showing a state where radar for vehicle according to an embodiment (2) is attached to a vehicle so that a normal line of an electric-wave emission surface is parallel to the horizontal direction.

Next, a radar for vehicle according to an embodiment (3) will be described. FIG. 3 is a schematic diagram showing a state where a radar 21 for vehicle according to the embodiment (3) is attached to a vehicle 22 so that a normal line of an electric-wave emission surface is parallel to the horizontal direction. A transmission antenna (not shown) of the radar 21 for vehicle is attached in the bumper (at a position of H₁ (for example, 0.5 m) in height from a road surface 23) of the vehicle 22. Also, the radar 21 for vehicle is configured so that the vertical directivity pattern of the antenna is asymmetric with respect to an axis X of the directivity. In FIG. 3, reference numeral 21a denotes the directivity pattern of the antenna of the radar 21 for vehicle in the vertical plane. The transmission antenna of the radar 21 for vehicle is given an electric tilt in advance. Therefore, an angle between the axis X of the directivity and the horizontal direction is a predetermined angle θ_α.

It is assumed that the predetermined θ_α is in a range of 2° to 5°. In this case, when the radar 21 for vehicle is attached to the vehicle 22 so that a normal line of the electric-wave emission surface is parallel to the road surface 23 (the horizontal direction), the same effect as the embodiment (1) can be obtained. That is, it is possible to prevent the radar 21 for vehicle from detecting a single object as plural objects erroneously. Also, it is possible to prevent the radar 21 for vehicle from detecting a structure existing at a relatively high position (3.5 m or more in height) such as a land bridge and ceiling of tunnel.

Figure 4:
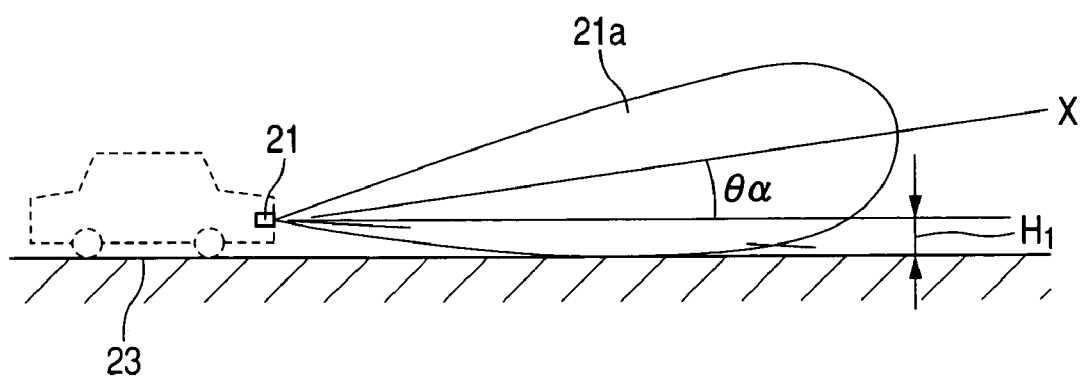
FIG. 4 is a schematic diagram showing a state where the radar for vehicle according to the embodiment (2) is attached to the vehicle.
Figure 5:
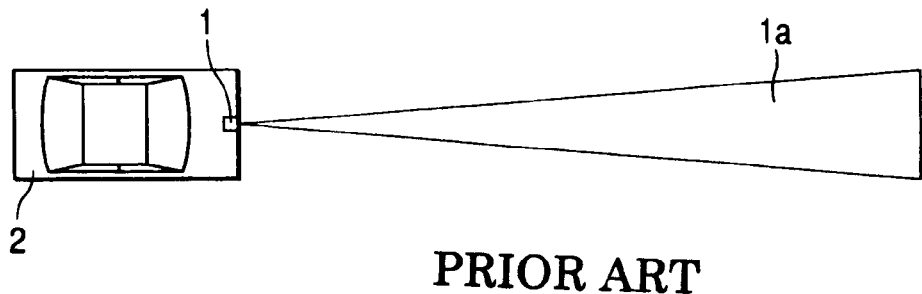
FIG. 5 is a schematic diagram showing a state where conventional radar for vehicle is used.
Figure 6:
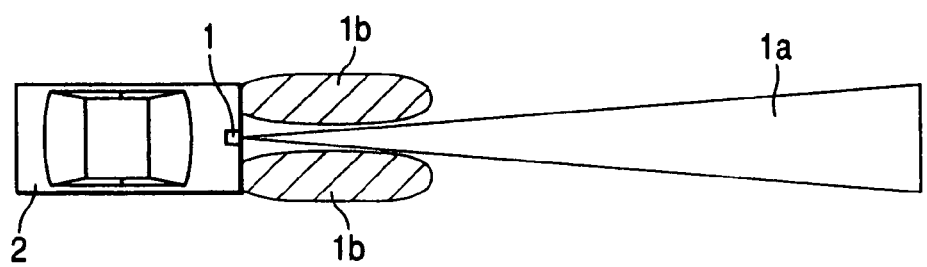
FIG. 6 is a diagram showing a blind spot that occurs when the conventional radar for vehicle is used.

Next, it is assumed that the angle θ_α is less than 2° or larger than 5°. FIG. 4 is a schematic view showing an example where the angel θ_α caused by the tilt is less than 2°. In this case, the angle θ_α can be corrected with using the bracket 100 and the casing 201 described in the embodiment (2). The combination of the bracket 100 and the casing 201 provides the angle θ₁ as described above. Therefore, it can be seen that the same effect as the embodiment (1) can be obtained so long as sum of the angle θ₁ provided mechanically and the angle θ_α provided electrically is in a range of 2° to 5°.

Accordingly, by giving the electric tilt to the antenna, it is possible to set the angle between the axis of the directivity pattern of the antenna having the asymmetric vertical directivity pattern and the horizontal direction to be in a range of 2° to 5°. The bracket 100 of the embodiment (2) having the protrusion pieces 103a, 103b may not be used so long as the angle θ_α is in a range of 2° to 5°.

However, if the electric tilt is given to the antenna, other properties of the antenna are affected largely. As a result, there is fear that design change of the antenna may be required. In comparison with design change of the bracket 100 and the casing 201, the design change of the antenna requires long time and large cost. Therefore, it is advantageous in cost to provide the angle θ₁ mechanically by the bracket 100 and the casing 201 in comparison with the tilt.

What is claimed is:

1. A method for attaching radar adapted to emit an electric wave from an antenna and to receive a reflection wave of the electric wave, comprising:

attaching the radar to a vehicle so that an axis of a directivity pattern of the antenna directs upward with respect to a horizontal direction; and adjusting a posture of the antenna so that a reception level of the reflection wave reflected from an object which is positioned at a predetermined height above a horizontal plane of the antenna is no more than a first predetermined threshold level capable of distinguishing the reflection wave from a noise and/or adjusting the posture of the antenna so that the reception level of the reflection wave reflected from an object which is positioned at a predetermined distance from the antenna is no less than a second predetermined threshold level capable of distinguishing the reflection wave from a noise, wherein:

the antenna of the radar has an asymmetric vertical directivity pattern with respect to the axis of the directivity pattern.

2. The method for attaching the radar according to claim 1, wherein a horizontal directivity of the antenna has a half width at a half maximum in a range of 10° to 60°.

3. The method for attaching the radar according to claim 1, wherein in the attaching, the radar is attached to the vehicle so that the axis of the directivity pattern of the antenna directs upward by two or more degrees with respect to the horizontal direction.

4. The method for attaching the radar according to claim 1, wherein in the attaching, the radar is attached to the vehicle so that an angle between the axis of the directivity pattern of the antenna and the horizontal direction is equal to or less than 5°.

5. The method for attaching the radar according to claim 1, wherein in the vertical directivity pattern of the antenna, an upper area with respect to the axis of the directivity pattern of the antenna is larger than a lower area.

6. The method for attaching the radar according to claim 1, wherein:

the antenna of the radar is configured so that a gain in a lower direction is smaller than that in an upper direction; and the antenna of the radar has an asymmetric vertical directivity pattern with respect to the axis of the directivity pattern.

7. A method for attaching a radar, comprising:

attaching a bracket to a vehicle; and attaching the radar to the bracket so that an axis of a directivity pattern of an antenna directs upward with respect to a horizontal direction, wherein:

the antenna of the radar has an asymmetric vertical directivity pattern with respect to the axis of the directivity pattern; and a horizontal directivity of the antenna has a half width at a half maximum in a range of 10° to 60°.

8. The method for attaching the radar according to claim 7, wherein:

in the attaching, the radar is attached to the vehicle so that an angle between the axis of the directivity pattern of the antenna and the horizontal direction is in a range of 2° to 5°; and in the vertical directivity pattern of the antenna, an upper area with respect to the axis of the directivity pattern of the antenna is larger than a lower area;

in the attaching, the radar is attached in a bumper of the vehicle; and the radar is a short range radar.

9. A radar for vehicle, comprising:

a transmission antenna that emits an electric wave, wherein:

the transmission antenna of the radar has an asymmetric vertical directivity pattern with respect to an axis of a directivity pattern;

a horizontal directivity of the transmission antenna has a half width at a half maximum in a range of 10° to 60°; and when the radar for vehicle is attached to a vehicle, the axis of the directivity pattern of the transmission antenna directs upward with respect to a horizontal direction.

10. The radar for vehicle according to claim 9, further comprising:

a bracket; and a casing, wherein:

the transmission antenna is disposed in the casing; and when the casing is attached to the vehicle via the bracket, the axis of the directivity pattern of the transmission antenna directs upward with respect to the horizontal direction.

11. The radar for vehicle according to claim 9, wherein an angle between the axis of the directivity pattern of the transmission antenna and the horizontal direction is equal to or larger than 2°.

12. The radar for vehicle according to claim 9, wherein an angle between the axis of the directivity pattern of the transmission antenna and the horizontal direction is equal to or smaller than 5°.

13. The radar for vehicle according to claim 9, wherein:

the bracket includes a bottom plate and two side plates;

a first protrusion piece that protrudes outwardly is formed at an end portion of each side plate;

second protrusion pieces that protrude outwardly are formed on the casing; and an angle between surfaces, abutting against the second protrusion pieces, of the first protrusion pieces and the bottom plate is in a range of 2° to 5°.

14. The radar for vehicle according to claim 9, wherein:

the bracket includes a bottom plate and two side plates;

a first protrusion piece that protrudes outwardly is formed at an end portion of each side plate;

second protrusion pieces that protrude outwardly are formed on the casing; and an angle between one of surfaces of the second protrusion pieces that abut against the first protrusion pieces and the other surface thereof is in a range of 2° to 5°.

15. The radar for vehicle according to claim 9, further comprising:

a signal transmission section that inputs a transmission signal to the transmission antenna;

a reception antenna that receives reflection wave that is emitted from the transmission antenna and reflected by an object; and a signal processing section that is connected to the reception antenna and the signal transmission section, wherein:

the signal processing section calculates a distance between the radar and the object based on the transmission signal input from the signal transmission section and a reception signal input from the reception antenna.

16. A monitoring method of an object, comprising:

emitting an electric wave from an antenna that has an asymmetric vertical directivity pattern and has an axis of a directivity pattern directing upward with respect to a horizontal direction;

adjusting a posture of the antenna so that a reception level of the reflection wave reflected from an object which is positioned at a predetermined height above a horizontal plane of the antenna is no more than a first predetermined threshold level capable of distinguishing the reflection wave from a noise and/or adjusting the posture of the antenna so that the reception level of the reflection wave reflected from an object which is positioned at a predetermined distance from the antenna is no less than a second predetermined threshold level capable of distinguishing the reflection wave from a noise; and receiving a reflection wave of the electric wave.

17. The monitoring method of the object according to claim 16, wherein an angle between the axis of the directivity pattern of the antenna and the horizontal direction is in a range of 2° to 5°.

18. A method for attaching radar comprising:

disposing the radar at a predetermined position of a vehicle so that an axis of a directivity pattern of an antenna directs upward with respect to a horizontal direction; and adjusting a posture of the antenna so that a reception level of the reflection wave reflected from an object which is positioned at a predetermined height above a horizontal plane of the antenna is no more than a first predetermined threshold level capable of distinguishing the reflection wave from a noise and/or adjusting the posture of the antenna so that the reception level of the reflection wave reflected from an object which is positioned at a predetermined distance from the antenna is no less than a second predetermined threshold level capable of distinguishing the reflection wave from a noise, wherein:

an antenna of the radar has an asymmetric vertical directivity pattern with respect to the axis of the directivity pattern.

\* \* \* \* \*